United States Patent
Tabata et al.

(10) Patent No.: US 6,680,430 B2
(45) Date of Patent: Jan. 20, 2004

(54) SPEAKER EDGE, METHOD OF FOAM-MOLDING THE SAME, APPARATUS FOR FOAM-MOLDING THE SAME, SPEAKER EDGE FOAM-MOLDING SYSTEM, AND SPEAKER EMPLOYING THE SPEAKER EDGE

(75) Inventors: Shinya Tabata, Mie (JP); Shinya Mizone, Tsu (JP); Yoshiyuki Takahashi, Matsusaka (JP); Kiyoshi Ikeda, Matsusaka (JP); Hiroko Yamazaki, Matsusaka (JP); Shinji Okuda, Takarazuka (JP); Masaharu Takada, Osaka (JP)

(73) Assignees: Matsushita Electric Industrial Co., Ltd., Osaka (JP); Sunstar Engineering, Inc., Osaka (JP)

( * ) Notice: Subject to any disclaimer, the term of this patent is extended or adjusted under 35 U.S.C. 154(b) by 18 days.

(21) Appl. No.: 10/149,621

(22) PCT Filed: Oct. 18, 2001

(86) PCT No.: PCT/JP01/09167
§ 371 (c)(1),
(2), (4) Date: Jul. 1, 2002

(87) PCT Pub. No.: WO02/35883
PCT Pub. Date: May 2, 2002

(65) Prior Publication Data
US 2003/0106740 A1 Jun. 12, 2003

(30) Foreign Application Priority Data
Oct. 26, 2000 (JP) .......................... 2000-327420

(51) Int. Cl.[7] ............................................. G10D 15/00
(52) U.S. Cl. ............................. 84/171; 84/172; 84/173; 84/174
(58) Field of Search .................. 181/171, 172, 181/173, 174

(56) References Cited

U.S. PATENT DOCUMENTS

| 3,980,841 A | * | 9/1976 | Okamura et al. | 181/294 |
| 5,455,396 A | * | 10/1995 | Willard et al. | 181/172 |
| 6,039,145 A | * | 3/2000 | Ogura et al. | 181/167 |

FOREIGN PATENT DOCUMENTS

| JP | 56004998 | * | 1/1981 |
| JP | 03040599 | * | 2/1991 |
| JP | 8-207074 | * | 8/1996 |
| JP | 09187097 | * | 7/1997 |
| JP | 10-25327 | * | 1/1998 |
| WO | 02/35883 | | 5/2002 |

* cited by examiner

Primary Examiner—Shi-Yung Hsieh
(74) Attorney, Agent, or Firm—Jordan and Hamburg LLP

(57) ABSTRACT

A speaker edge is made of a thermosetting composition consisting of a polyurethane prepolymer and an inactivated solid polyamine as a latent hardener. A gas is dispersed in the thermosetting composition, prior to feed into a mold, so that it can foam and solidify to give the speaker edge. In a method of making the speaker edge, the composition will be injected into a female mold segment heated below the critical thermosetting temperature, foaming the composition. Then placed in the female segment is a male segment heated above the critical temperature, causing the ingredients to react with each other to solidify in the mold. An apparatus for making the speaker edge from the composition has: a device for intake of a gas, another device for injecting the composition into the gas, another device for mechanically dispersing the gas throughout the composition, still another device for injection of this gas-containing composition into a female mold segment, a further device for placing a male segment in the female segment, and a still further device for solidifying the composition, while foaming it.

16 Claims, 11 Drawing Sheets

Cross Section of Speaker Edge of Invention
Microscopic Photo
60 magnifications

Foaming Ratio of 2.5
much finer void cells

Cross Section of Speaker Edge of Invention

Microscopic Photo 60 magnifications

Foaming Ratio of 2.5 much finer void cells

Cross Section of the Prior Art Speaker Edge

Microscopic Photo    60 magnifications

Void cells in speaker edge of invention

Void cells in prior art speaker edge

Histogram of cell diameter

SPEAKER EDGE, METHOD OF FOAM-MOLDING THE SAME, APPARATUS FOR FOAM-MOLDING THE SAME, SPEAKER EDGE FOAM-MOLDING SYSTEM, AND SPEAKER EMPLOYING THE SPEAKER EDGE

FIELD OF THE INVENTION

The present invention relates to a speaker edge disposed around a vibration plate (viz., conical body) of the speaker and adjoined to the inner periphery of a frame so as to hold the vibration plate in its correct position where it is not hindered from freely vibrating. In particular, the present invention relates to a speaker edge that is produced using a thermosetting composition and a mechanically foaming means, and also relates to foam-molding method and system and a foam-molding apparatus, all being designed to manufacture the speaker edge.

PRIOR ART

Usually, each speaker has a main vibration plate 7 whose periphery is connected by a speaker edge 7a to a frame 16, as shown in FIG. 1. The main vibration plate 7 taking this position is not hindered from vibrating in an axial direction. The speaker edge 7a has in cross section an arcuate portion (viz., corrugation) 115 that is curved upward or downward between its outer and inner peripheries, lest the vibration plate 7 should suffer any difficulty when vibrating transversely.

In some cases, the prior art speaker edges 7a have been formed of a vulcanized rubber foam. In other cases, a thermoplastic resin such as an acrylic polymer, a polycarbonate, a polyurethane, a polyester, a polyolefin or the like has been molten and injection molded around the periphery of each vibration plate 7. Alternatively, a foamed polyurethane block has been severed into slabs, each being subsequently sliced into thin sheets of a given thickness so as to be heated and pressed in a mold to give the speaker edge 7a.

The molten thermoplastic resin will be kept at an elevated temperature from about 200° C. to 300° C. when injection molding the speaker edge 7a. Thus, the vibration plate 7 being bonded to and made integral with this edge within a couple of mold segments 41 and 42 is likely to suffer from thermal deterioration.

It is a further problem that the vulcanized foam rubber has failed to provide a sufficiently high ratio of foaming, thus increasing overall weight of the speaker edge and vibration plate bonded thereto. In such an event, the frequency-to-sound pressure property will be rendered inferior to those which have been made lighter. In addition, the speaker edge of such a vulcanized foam rubber has to be adhered to the vibration plate, using a highly sophisticated adhesion technology and nevertheless encountering difficulties in adhesion process.

FIG. 10 illustrates a speaker edge 7a' (hereinafter called 'thermally compressed article of polyurethane foam slab/sheets') whose arcuate portion has basal ends 7b. The rear (convex) corner of each basal end 7b is thermally stretched to have a lower density, during the pressing process within a mold. Consequently, the front (concave) corner of each basal end 7b is rendered higher in density, due to compression. Such an unevenness in density produced between the front and rear corners or surface layers has undesirably impaired strength and durability. The inner periphery of such a speaker edge 7a' vibrates in unison with the periphery of vibration plate 7, but with the outer periphery of said edge 7a' being retained in place by the frame 16. As a result, fatigue of material will proceed exclusively in one of those basal ends 7b, adjacent to the frame 16. The thinned region 7c of each arcuate portion basal end has not necessarily been satisfactory in strength.

Each slab of polyurethane foam is not free from unevenness from region to region, due to the foaming process itself. The sheets sliced from such a slab for forming the thermally compressed article 7a' of polyurethane foam do inevitably differ in density, corresponding to the regions in said slab. Thus, speakers 1 comprising the thermally compressed speaker edges 7a' each composed of those slab sheets will show a considerable variation in their minimum resonance frequency $f_o$, varying quality or performance of them. For example, variation of $f_o$ measured for 100 samples was found ±15 Hz.

FIG. 18 is an enlarged cross-sectional scheme of the thermally compressed speaker edge 7a' made of the slab sheets 117 shown in FIG. 10. As seen in FIG. 18, a surface layer has been depressed during the thermally compressing molding process so that void cells in said layer are collapsed to give a harder and denser skin 68. An apparent boundary will be recognized between this skin and an inner regularly foamed core. Physical properties change sharply across the boundary, increasing amplitude of the resonance and causing a distortion in tone quality.

An internal texture of the thermally compressed slab/sheets article 7a' will be seen in FIG. 3, that is a photo taken using a microscope of 60 magnifications. There will be observed a surprising visual difference between this photo and FIG. 2 that is another microscopic photo of the same magnifications showing the speaker edge 7a of the resent invention.

Speakers built in automobile car doors or the like must be waterproof, whereas polyurethane slabs absorb water from their outer surface. The prior art speaker edges 7a' that are polyurethane slab sheets thermally compressed are therefore not waterproof to a sufficient degree. In order to resolve this drawback, it has been proposed to coat the surfaces of speaker edges with a fluoride resin. However, in view of the open-cell structure of those prior art speaker edges, any excessively thick coating that will clog the cell openings with the fluoride resin should be avoided. Thus, any satisfactory waterproofing finish has not been available, despite a noticeably raised manufacture cost.

The preceding Japanese patent application No. 11-61879 discloses an improvement in the described prior art speaker edges. According to this proposal, a two-fluid reactive composition comprising an isocyanate and a polyol will be fed into a pair of male and female segments of a mold, through a stirring mixer. Within the mold, the two ingredients will react one with another to foam and solidify, for example at about 60° C. Due to such a low temperature, each cycle of molding the speaker edge will necessitate an undesirably long time, for example 2 minutes. Further, the two-fluid ingredients once blended together will solidify so soon that the mixer is jammed with them, unless immediately transferred to the mold. Process management, including process control of interrupted operation, will thus be rendered intricate and troublesome. The tow-liquid type raw material is so susceptible to ambient condition such as humidity that the foaming ratio tends to vary between batches or lots, making it difficult to ensure uniform quality.

DISCLOSURE OF THE INVENTION

The present invention was made in view of the drawbacks inherent in the prior art speaker edges and the prior art method of making same. A novel speaker edge provided herein is made of a thermosetting composition that is a mixture of main ingredients, wherein the main ingredients are a polyurethane prepolymer and a latent hardener, and the latent hardener is an inactivated solid polyamine. In manufacture of the speaker edge, a gas will be dispersed in the thermosetting composition, prior to feed thereof into a female mold segment heated to a temperature below the critical thermosetting temperature. Subsequently, a male mold segment that has previously been heated to a higher temperature above the critical temperature will be pressed and fitted in the female segment so that the ingredients react with each other to solidify within the mold. In other words, the thermosetting composition in the invention is of the one-liquid type and capable of self-foaming by virtue of the gas mechanically dispersed in said composition, whereby it can be molded directly around the main vibration plate so as to foam and solidify surrounding the periphery hereof.

Such a one-liquid type thermosetting composition of the invention can be injected into a mold either continuously or intermittently, and much more smoothly than in the case of the patent application No. 11-061879. Interruption of the molding process can be managed more easily and at any time wanted. The composition need not be fed to the mold immediately after the step of blending the isocyanate and polyol, thereby diminishing material loss. There will be produced no flashes or waste around the molded piece to be severed therefrom, so that consumption of raw materials can now be reduced and any extra control is not needed in the molding process, also lowering manufacture cost. The thermosetting takes place instantly upon heating to a temperature above the critical temperature to give speaker edges of uniform quality. Thus, the foam-molding method provided herein to produce the speaker edges can be carried out by easier operations and nevertheless decreasing the amount of industrial wastes.

A first species of the present invention provides a speaker edge made of a thermosetting composition that is a mixture of main ingredients, wherein the main ingredients are a polyurethane prepolymer and a latent hardener, and the latent hardener is an inactivated solid polyamine. A gas will be dispersed in the thermosetting composition, prior to feed thereof into a mold, so that the composition foams and solidifies itself therein to give the speaker edge. The thermosetting composition is of the one-liquid type in which the gas is mechanically dispersed to subsequently foam the composition in a simple physical manner.

A second species of the present invention provides such a feature that the foamable thermosetting composition is fed to the mold and around the main vibration plate so that the speaker edge thus formed as defined in the first species is directly and spontaneously adhered to and integral with the periphery of said plate.

A third species of the present invention provides such a feature that, in the speaker edge as defined in the first or second species, internal void cells are physically produced by instant expansion of the gas bubbles that have mechanically been dispersed in the composition, upon injection into the mold where each bubble's internal pressure is allowed to equilibrate with atmospheric pressure. The foamed structure produced in this manner may consist of closed cells only, or consist of closed cells and open cells in mixture.

A fourth species of the present invention provides such a feature that, in the speaker edge as defined in any one of the first to third species, the void cells contained therein are of a size falling within a range of $1\mu$ to $100\mu$. Such a fine and uniform size of void cells is realized herein by virtue of the physical foaming of fine gas bubbles mechanically dispersed in the thermosetting composition, which bubbles are then allowed to expand in the due to equilibrium between the internal pressure of each bubble and the atmospheric pressure.

A fifth species of the present invention provides such a feature that, in the speaker edge as defined in any one of the first to fourth species, the void cells as defined in any of the first to fourth species have diameters whose average is $20\mu$ and which are distributed beside this average. Owing to mechanical dispersion of the gas and physical expansion thereof within the speaker edge, the void cells are of uniform diameters as indicated by a sharp and histogram-like graph shown in FIG. 12.

A sixth species of the present invention provides such a feature that, in the speaker edge as defined in any one of the first to fifth species, it has a density falling within a range of 0.15–0.9 g/cm$^3$. The foaming process relying on the mechanical dispersion and physical expansion of gas bubbles does facilitate precise control of the foaming ratio.

A seventh species of the present invention provides such a feature that, in the speaker edge as defined in any one of the first to sixth species, it may have a skin layer whose surface is embossed with the pattern of the mold's internal surface.

An eighth species of the present invention provides such a feature that, in the speaker edge as defined in any one of the first to seventh species, it may have the skin layer that smoothly continues to an inner core of said edge, without any apparent or distinctive boundary intervening between them. This is because the void cells are scarcely collapsed within the mold for producing the foamed speaker edge, thus ensuring uniform distribution of cells.

A ninth species of the present invention provides such a feature that, in the speaker edge as defined in any one of the first to eighth species, it may have an arcuate portion whose thin basal ends are at least of the same density as that of the remaining thicker regions. This feature results from the fact that any already foamed article is not pressed in the mold, but an unfoamed material mass is foamed and solidified in the mold. Thus, the arcuate portion has an overall density equal to or higher than that of adjacent body regions of said speaker edge, thus affording smooth and even transmission of vibration.

The present invention further provides, in its tenth species, a method of making a speaker edge. This method comprising the steps of preparing a thermosetting composition whose main ingredients are a polyurethane prepolymer and a latent hardener, the latent hardener being an inactivated solid polyamine, then mechanically dispersing a gas throughout the thermosetting composition, thereafter injecting this composition into a female mold segment heated to a temperature below the critical thermosetting temperature, and subsequently putting a male mold segment in the female segment, wherein the male segment is heated to a higher temperature above the critical temperature so that the ingredients react with each other to solidify within the mold while being foamed. In practice, the female mold segment may either be heated to the temperature below the critical temperature prior to or immediately after injection of the thermosetting composition, or alternatively be heated at any desired point of time but quickly in a short time after injection. On the other hand, the male segment of the forming mold may either be previously heated to the other temperature above the critical one, or be heated instantly upon press-fitting of the male segment in the female one. The foamed and solidified speaker edges can now be produced at a higher rate and at a surprisingly improved manufacture efficiency.

An eleventh species of the present invention provides such a feature that, in the method as defined in the tenth species, it may utilize a high-frequency induction heater for heating the mold so as to efficiently solidify and foam the thermosetting composition therein. This induction heater will raise the temperature in an instant to thereby shorten the cycle time spent to heat mold.

The present invention still further provides, as its twelfth species, an apparatus for carrying out the method of making from a thermosetting composition a speaker edge as defined hereinbefore. This apparatus comprises:

1. a suction device linked to a piston-type pump having a cylinder in which the piston reciprocates, the device acting to suck air into the cylinder during suction stroke of the piston;

2. a feed device for charging the cylinder with the composition after the cylinder is filled with the gas;

3. a stirring device for mechanically mixing with the composition with the gas during exhaustion stroke of the piston;

4. a compression device for injecting the gas-dispersed thermosetting composition into a female segment of a mold forming the speaker edge, wherein the female segment is heated to a temperature below the thermosetting critical temperature;

5. a pressing device for fitting a male segment in the female segment, wherein the male segment is heated to another temperature above the thermosetting critical temperature; and

6. a molding device for foaming and solidifying therein the foamable thermosetting composition.

A thirteenth species of the present invention provides such a feature that, in the apparatus as defined in the twelfth species, it may utilize as or in connection with the molding device a high-frequency induction heater to solidify and foam the thermosetting composition. This induction heater will raise the temperature in a shortened time and at a lowered cost.

The present invention does also provide as its fourteenth species a system for making from a thermosetting composition a speaker edge. This system comprises:

(1.) a suction process using a piston-type pump that has a cylinder in which the piston reciprocates, the process being designed to suck air into the cylinder during suction stroke of the piston;

(2.) a feed process for charging the cylinder with the composition after the cylinder is filled with the gas;

(3.) a stirring process for mechanically mixing with the composition with the gas during exhaustion stroke of the piston;

(4.) a compression process for injecting the gas-dispersed thermosetting composition into a female segment of a mold forming the speaker edge, wherein the female segment is heated to a temperature below the thermosetting critical temperature;

(5.) a pressing process for fitting a male segment in the female segment, wherein the male segment is heated to another temperature above the thermosetting critical temperature; and (6.) a molding process for foaming and solidifying therein the foamable thermosetting composition.

In this system, the reciprocal piston-pump is used to intermix the air with the thermosetting composition for forming the speaker edge. The gas is continuously dispersed in the composition which is subsequently allowed to foam itself in a successive manner. In contrast with the prior art chemical method of foaming the composition, the foaming is done herein in a physical manner. The piston-pump enables a highly accurate blend ratio of the gas to the composition, making it possible to precisely control the foaming degree of the resultant product. Either the forming mold or the thermosetting composition itself is heated in a direct manner, thereby accelerating the solidification of said composition and improving manufacture efficiency.

A fifteenth species of the present invention provides such a feature that, in the system as defined in the fourteenth species, it may utilize, in the molding process for foaming and solidifying therein the foamable thermosetting composition, a high-frequency induction heater. This induction heater employed in the system of the invention will instantly and directly heat said composition injected into the mold. This system is adapted to a case wherein the mold is not heated, but solely the composition itself is heated.

The present invention does further provide as its sixteenth species a speaker comprising a vibration plate built therein and a speaker edge, wherein the speaker edge is made of a thermosetting composition whose main ingredients are a polyurethane prepolymer and a latent hardener, with the latent hardener being an inactivated solid polyamine. A gas will be dispersed in and throughout the thermosetting composition, prior to feed thereof into a mold, so that the composition foams and solidifies itself therein to give the speaker edge. Such a speaker thus manufactured efficiently does scarcely show distortion in tone quality, its resonance frequency in the bass zone being not lowered too much, and is of an improved resistance to heat and water.

THE PREFERRED EMBODIMENTS

Figure 1:
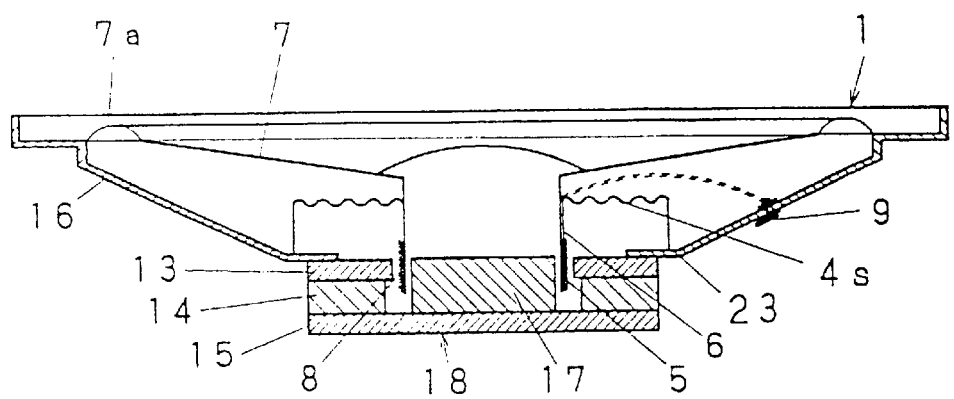
FIG. 1 is a vertical cross section of the ordinary type speaker.

Now, some preferred embodiments of each species will be described below, referring to the drawings.

The present description recites here the international patent laying-open gazette No. WO 95/26374 issued for the application filed one of the present applicants. This gazette discloses details and examples of the thermosetting composition used herein as the main raw material to form the speaker edge of the invention. Summarizing the preceding invention of ours, a polyisocyanate and/or a urethane polymer may be used in combination or solely, wherein the urethane polymer consists of molecules each having active ends sue to an excessive amount of polyisocyanate reacted with a polyol. A fine powder of a coating amine compound is used as a latent hardener that is an inactivated solid polyamine having a melting point of 50° C. or higher and a median diameter of about 20μ or less. Each particle of the polyamine is covered with a fine powder whose median diameter is 2μ or less so as to block and inactivate the active amino groups. Mole ratio of the of the amino groups to the isocyanate groups is from 1:0.5 to 1:2.0 after thermal activation of the amino groups.

The polyurethane prepolymer used herein as one of the main ingredients is any one, or any combination, of a polyisocyanate and a polyurethane prepolymer, wherein the latter is prepared by reaction of a polyol with an excessive amount of a polyisocyanate compound so as to have active ends in each molecular chain. The solid polyamine is a compound that consists of core particles of a polyamine, that in turn is solid at room temperature and polyamine and has a melting point of 50° C. or higher and a median diameter of about 20μ or less. Each particle is covered with a fine powder whose median diameter is 2μ or less so as to block and inactivate the active amino groups present in the surface of said particle. Ratio of the solid polyamine to the fine powder is selected to be 1:0.001–1:0.5 in weight.

The polyisocyanate maybe selected from aromatic compounds, aliphatic compounds and alicyclic compounds each having isocyanate groups. Examples are: toluylene diisocyanate (TDI), diphenylmethane diisocyanate, 3,3'-dimethyl-4,4'-biphenylene diisocyanate, 1,4-phenylene diisocyanate, xylylene diisocyanate, tetramethylxylylene diisocyanate, naphthylene diisocyanate, dicyclohexylmethane-4,4'-diisocyanate, a crude TDI, polymethylene polyphenyldiisocyanate, isophorone diisocyanate, hexamethylene diisocyanate, hydrated xylylenediisocyanate, any isocyanurates, carbodiimide or biuret derived from the foregoing isocyanates. Any one or any mixture of two or more of these compounds may be used solely or in combination.

The polyurethane prepolymers each having active ends in its chain may be prepared by reaction of a polyol with an excess of polyisocyanate, at a mole ratio of OH groups to NCO groups falling within a range of 1.1–3.5. Such a reaction may be conducted with aid of a catalyst (such as: organic tin compounds including dibutyl tin-dilaurate, bismuth compounds including bismuth octylcarboxylate, and tertiary amine catalysts), at room temperature or at 60–90° C. for 1 to 24 hours. A resultant polyurethane prepolymer will have 0.5–10% by weight of the active isocyanate end groups and have a viscosity of 3000–50000 centipoises at 20° C.

The polyol may be any of: polyether-polyol derivatives of polyhydric alcohols such as ethylene glycol, propylene glycol, glycerol, trimethylol propane, pentaerythritol, sorbitol, or sucrose, wherein polyaddition of alkylene oxide such as ethylene oxide, propylene oxide or any mixture thereof has been carried out to these polyhydric alcohols; ethylene glycol, propylene glycol and their oligoglycol derivatives; polyol derivatives of butylene glycol, hexylene glycol or polytetramethyleneether glycol; polyester-polyol derivatives such as polycaprolactone polyol or polyethylene adipate; polybutadiene polyols; esters of higher (homologues of) carboxylic acids such as castor oil having hydroxyl groups; and, polymer-polyol derivatives of polyetherpolyol or polyesters to which a vinyl monomer is grafted.

As the polyurethane prepolymer serving as the one ingredient of the thermosetting composition referred to hereinbefore, any one of polyisocyanates listed above, or any polyurethane prepolymer having active end isocyanate groups, may be used. Alternatively, any mixture of these two kinds of compounds may substitute for one of them to be used alone.

The solid polyamine serving as the latent hardener for the polyurethane prepolymer are aromatic or aliphatic polyamines that are solid at room temperature and have a melting point of 50° C. or higher. Preferable examples of such polyamines are: 4,4'-diaminodiphenyl methane; 2,4'-diaminodiphenyl methane; 3,3'-diaminodiphenyl methane, 3,4'-diaminodiphenyl methane; 2,2'-diaminobiphenyl; 2,4'-diaminobiphenyl; 3,3'-diaminobiphenyl; 2,4-diaminophenol; 2,5-diaminophenol; o-phenylene diamine; m-phenylene diamine; 2,3-toluylene diamine; 2,4-toluylene diamine; 2,5-toluylene diamine; 2,6-toluylene diamine; 3,4-toluylene diamine; and the like solid aromatic polyamines. Other preferable examples are: 1,12-dodecane diamine; 2,10-decanediamine; 1,8-octanediamine; 1,14-tetradecane diamine; 1,16-hexadecane diamine; and the like aliphatic polyamines. Any one of these aromatic and aliphatic polymenies or any mixture thereof may be used solely or in combination. These polyamines must be pulverized to have a median diameter of 20μ, or more preferably from 3μ to 15μ.

In order to inactivate the solid and particulate polyamine functioning as the latent hardener, the surface of each minute particle may be covered with the powder of an 'inactivating agent'. This agent is an organic powder or an inorganic powder sticking to the particle surface. Examples of the inorganic inactivating agent are titanium dioxide, calcium carbonate, clay, silica, zirconia, carbon, alumina, and talc. Preferable organic inactivating agents are polyvinyl chlorides, polyacrylic resins, polystyrenes, and polyethylenes, all being in a powdery state. Median diameter of these powders may has to be $2\mu$ or less, and more preferably $1\mu$ or less. Inactivation of the solid polyamine is a treatment thereof such that the surface of each minute particle will be covered with the powder. Weight ratio of the polyamine to the powder is from 1:0.001 to 1:0.5, and the latter will be added to the former being pulverized to a predetermined or given target diameter within a shear-friction blender. Examples of such a blender are the so-called 'high-speed collision type stirring mixer', the 'compression-shearing type stirring mixer' and the like.

Mole ratio of isocyanate groups to amino groups is preferably from 1:0.5 to 1:2.0, at a stage when the inactivated solid polyamine added to the polyurethane prepolymer is heated to restore its activity.

In addition to the solid polyamine, any appropriate additives such as ordinary catalysts and plasticizers (for example, dibutyl phthalate, dioctyl phthalate, dicyclohexyl phthalate, diisooctyl phthalate, diisodecyl phthalate, dibenzyl phthalate, trioctyl phosphate, epoxy-based plasticizers, and polyester-based ones such as esters of adipic acid) may be used. Further agents for addition to the composition are: solvents, thixotropic agents, ultraviolet ray-absorbers, adhesion-assistants, dehydrating agents, foaming agents and the like, also used at an appropriate ratio.

The thermosetting composition prepared in the manner detailed above shows behavior sensitive to temperatures across the threshold or critical temperature of hardening. In detail, it does not harden itself at temperatures below about 60° C., though it will start to harden at a raised temperature of about 80° C. or higher due to reactivation of the previously inactivated solid polyamine. Hardening of the composition will proceed at that temperature, until becoming fully hardened. Periods for heating and cooling the forming mold are shortened, thanks to such a small difference between the non-hardening temperature and the hardening temperature, reducing the cycle time and contributing to an improved manufacture efficiency. On the other hand and as already discussed above, a gas involved in the thermosetting composition will produce fine bubbles mechanically dispersed throughout this composition to render it capable of self-foaming. The gas is air in the present embodiment, but it will be understood that any other gas that is of an inert nature like air may instead be employed herein. Details of the mechanical mixing of air bubbles with the thermosetting composition are disclosed in detail in our preceding patent application early published in the Japanese Laying-Open Gazette No. 11-128709.

Figure 6:
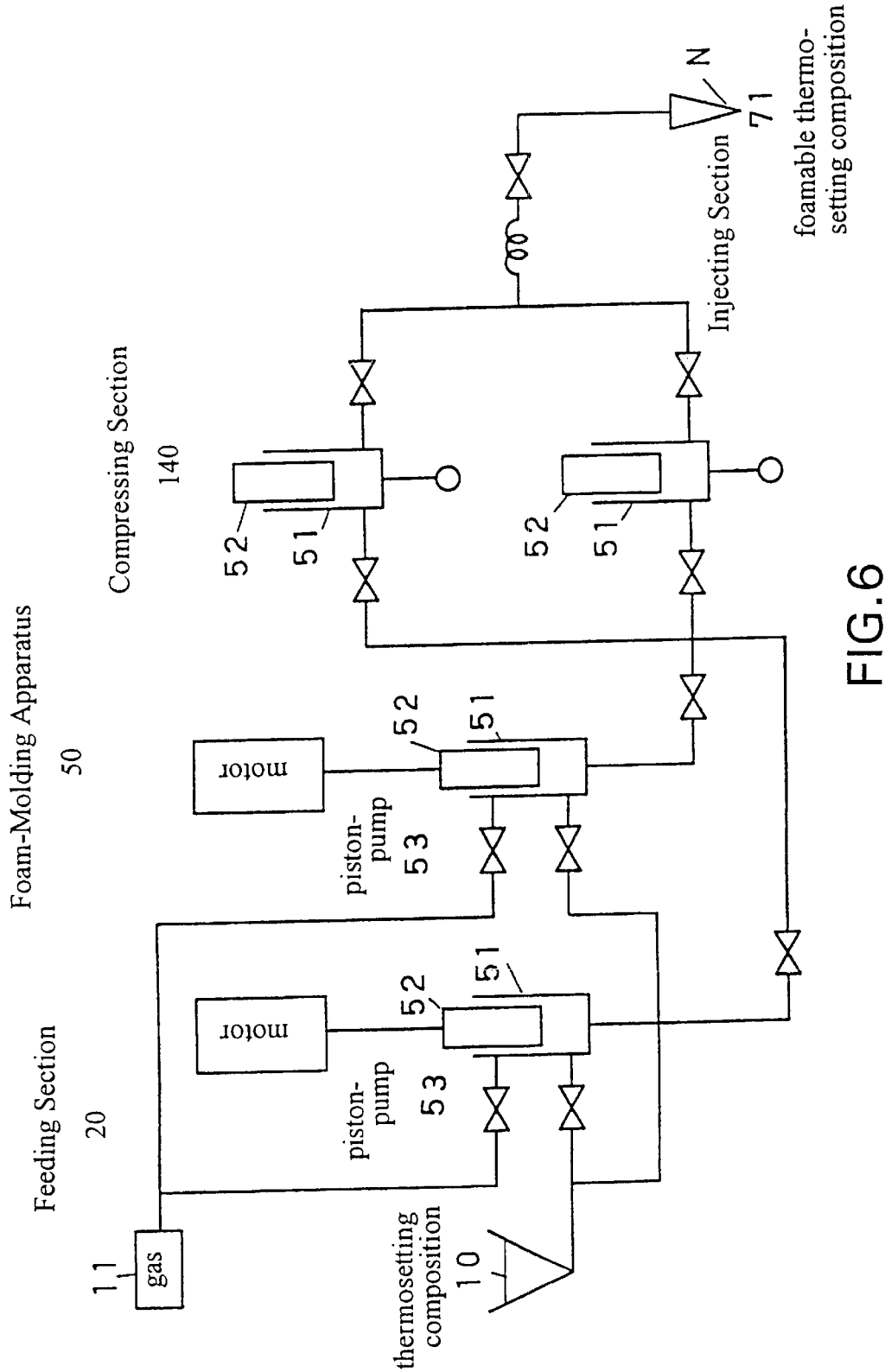
FIG. 6 is a block diagram showing the process in which a gas is mechanically intermixed with and dispersed in a thermosetting composition before compression and injection thereof so as to be foamed in the mold for forming the speaker edge.

Referring to the block diagram-like flow shown in FIG. 6, there is illustrated an apparatus 50 designed for use to foam-mold speaker edges of the invention. This apparatus 50 comprises a piston-type pump 53 having a cylinder 51 in which the piston 52 reciprocates to repeat suction strokes and exhaustion strokes one after another. During each suction stroke, a given amount of gas 11 will be fed into the cylinder 51, before a batch of the thermosetting composition 10 is delivered to the cylinder 51. During the subsequent exhaustion stroke of the piston in said pump 53, the mixture of gas 11 and composition 10 will be transferred via a piping to a further pump. This further pump constituting a compression station 140 and likewise composed of a piston 52 and a cylinder will deliver the batch of mixture under pressure to the injection station. Thus, a batch 71 of foamable thermosetting composition will be injected into the female segment 41 of a mold for forming the speaker edge, with the segment being heated but kept at a temperature below the critical hardening temperature. Subsequent to this step, the mold's male segment 42 already heated to a higher temperature above the critical hardening temperature will be pressed and fitted in the female segment, so that an overall temperature of the mold is raised to the critical one of about 60° C. to 80° C. to instantly harden the thermosetting composition.

The functions of the apparatus shown in FIG. 6 will be discussed in more detail. A feeding section 20 supplies the piston-type pumps 53 with the gas 11 and thermosetting composition 10 so that the latter 11 and 10 are intermixed with each other. Each piston-type pump 53 does substantially consist of the cylinder 51 and piston 52, and the gas 11 for foaming the composition will be sucked in the cylinder 51 during the suction stroke of the piston 52. Thereafter, a batch of the raw and fluid thermosetting composition 10 will be fed into this cylinder 51. During the subsequent exhaustion stroke of the piston, the composition 10 and the gas involved therein will be extruded into the piping while the gas being mechanically dispersed in the composition. The batch of thermosetting composition 71 thus rendered capable of foaming will move to a compression section 20 where the same piston-type pump or a booster pump will compress such foamable composition. The thus compressed and foamable thermosetting composition will subsequently be injected through a nozzle 'N' into the mold 40 that substantially consists of the female and male segments 41 and 42. A number of minute and compressed gas bubbles contained in said composition blown through the nozzle 'N' will expand in an instant upon exposure thereof to atmospheric pressure.

Figure 11:
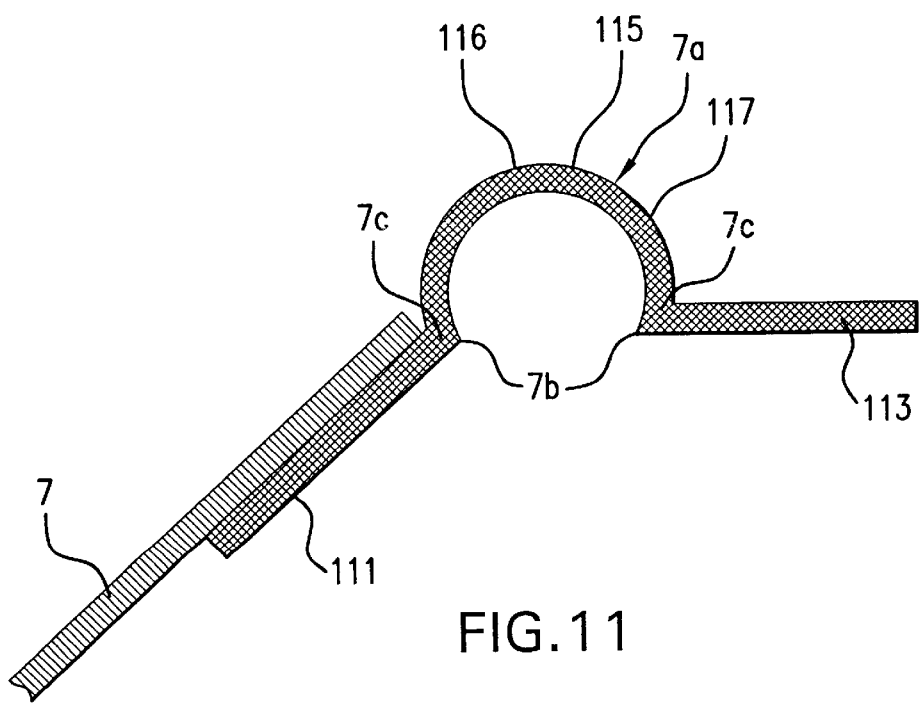
FIG. 11 is a similar cross section of another arcuate portion present in the speaker edge provided herein.

Since the mold 40 whose female segment 41 is at a temperature (about 60° C.) below the critical hardening temperature is also below this critical temperature as a whole, the composition 71 having foamed will never start to harden itself until the next step of process. However, once the male segment 42 heated to a temperature (about 80° C.) above the critical temperature is fitted in the female segment, the foamed composition becomes soon hotter than said critical temperature. As a result, the foamed thermosetting composition will now quickly harden itself within a short time, for instance in about 10 seconds, thereby acquiring a solid finished configuration as shown in FIG. 11. Although any kind of piston-type pump may be employed herein, the pump 53 described above and being of the reciprocal volume-activator type is preferable because the piston reciprocates within the cylinder to do precise strokes for suction and exhaustion. Both the gas and thermosetting composition are very accurately weighed and thoroughly dis-charged at each cycle of the pump. Batch-type feeds of them will thus be repeated correctly and with an excellent reproducibility. Dual type piston pumps are exemplified in the system shown in FIG. 6 and designed for mechanical mixing and dispersion of the gas in the composition and for subsequent compression and release to effect the physical foaming thereof. However, the piston-type pump or pumps may be designed in any other appropriate fashion taking into account the necessary rate of successive discharges. The means for heating the mold and/or the thermosetting composition may be selected from the known electric resistance heater, the electromagnetic induction heater, the ultrasonic heater, the high-frequency induction heater, and the like, all contributing to a high manufacture efficiency.

The speaker edge 7a produced by the described foam-molding method and apparatus is of an internal texture in which almost all the void cells are of the 'closed' type. Coexistence of open cells and closed cells will possibly appear if the foaming ratio is higher than that in the illustrated example. The body of the speaker edge thus produced may preferably be of a density falling within a range of 0.15–0.9 g/cm$^3$, in view of vibrational load applied to the vibration plate 7. A narrow distribution about a median size will be found for the void cells in the finished speaker edge provided herein, by virtue of spontaneous expansion of the mechanically dispersed minute gas bubbles. From macroscopic and microscopic points of view, the internal texture of the speaker edge is thus so uniform as remarkably improving the vibrational properties of the vibration plate. Preferably, the median diameter of those void cells has to be included in the range of 1–100$\mu$.

Figure 2:
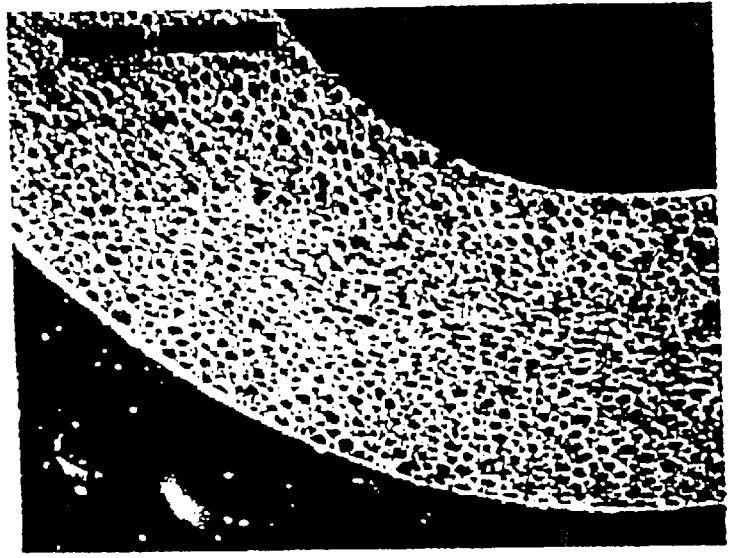
FIG. 2 is a cross-sectional photo of a speaker edge provided herein.
Figure 3:
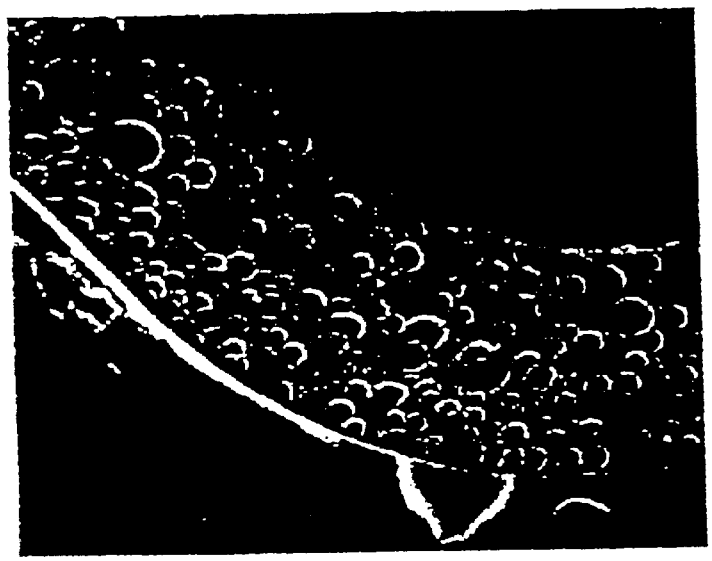
FIG. 3 is a similar photo of the prior art edge made of a foamed slab of two-liquid type polyurethane.
Figure 12:
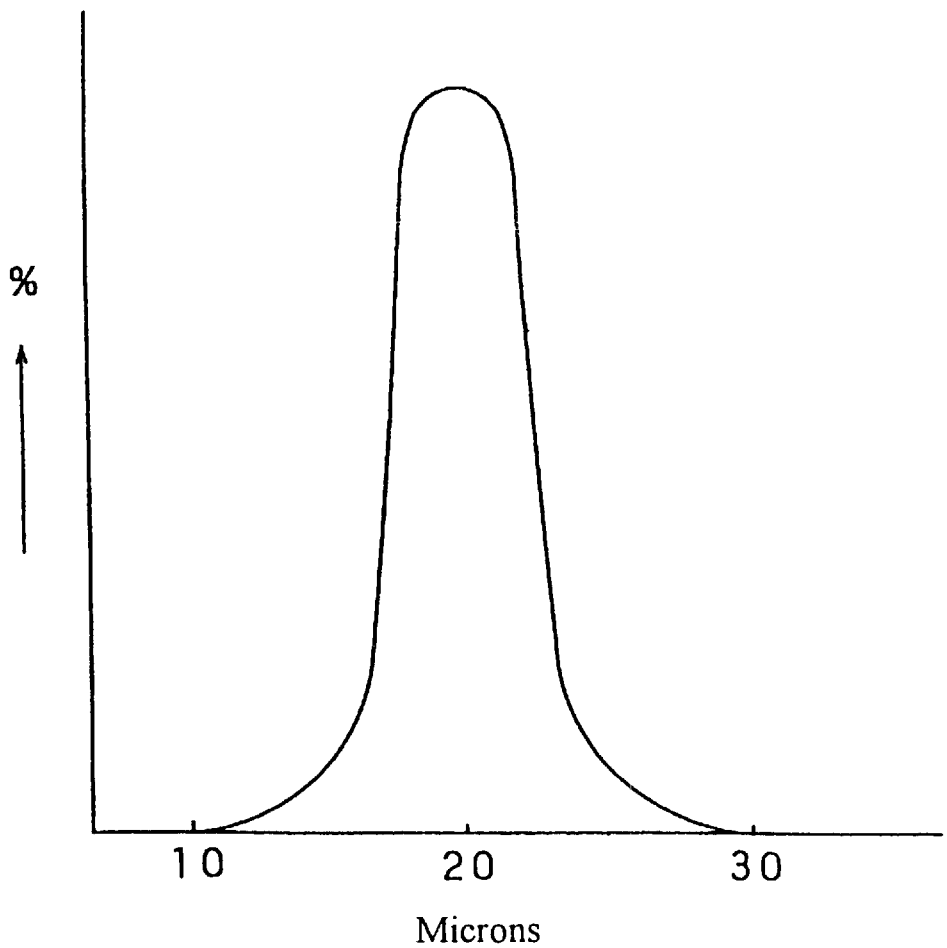
FIG. 12 is a histogram-like graph of the diameter of void cells present in the speaker edge of the invention.
Figure 13:
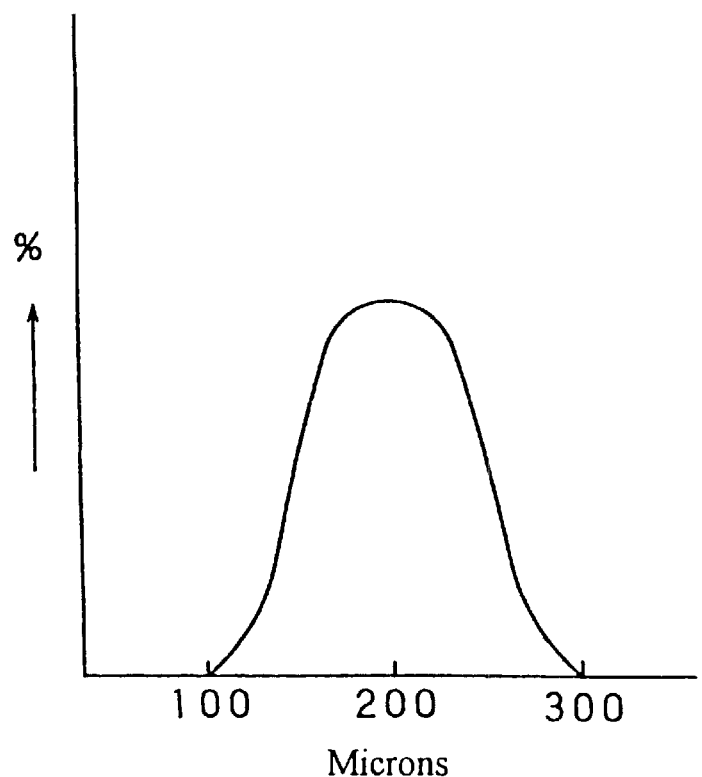
FIG. 13 also is a histogram-like graph of the diameter of void cells present in the prior art speaker edge.

The photo given as FIG. 2 shows the internal texture of the article provided herein by physically foaming the thermosetting composition in which minute gas bubbles have been dispersed in a mechanical manner. As seen in this photo, diameters of the void cells have an average of about 20$\mu$ and vary from about 1$\mu$ to about 100$\mu$. However, distribution of cell size is very narrow as shown in FIG. 12 wherein almost all the void cells have their diameters found to be close to the average: 20$\mu$. In contrast with such a uniform internal texture achieved by the invention, the prior art void cells existing in a foamed urethane slab of the two-liquid type shown in FIG. 3 are much coarser. Their diameters has an average of about 200$\mu$ and vary between 1–500$\mu$, showing a broader distribution as indicated in FIG. 13. Such a prior art texture will affect adversely the (tensile) strength, rigidity and bulk strength of the foamed speaker edge.

Figure 14:
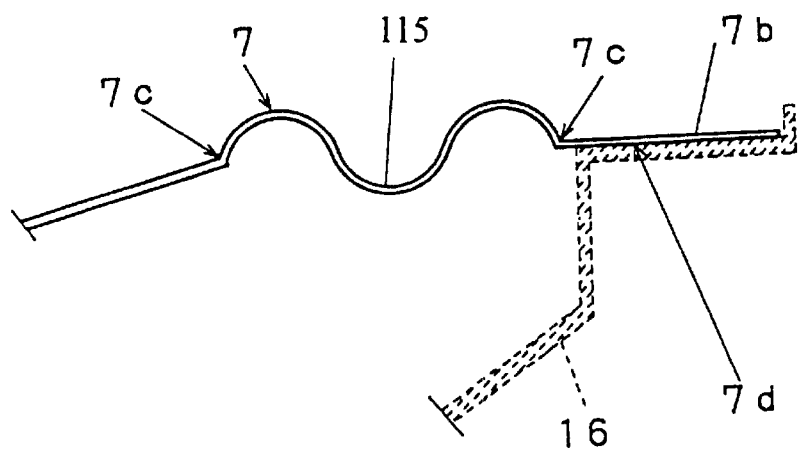
FIG. 14 is a cross section of a fixed periphery of the speaker edge.
Figure 15:
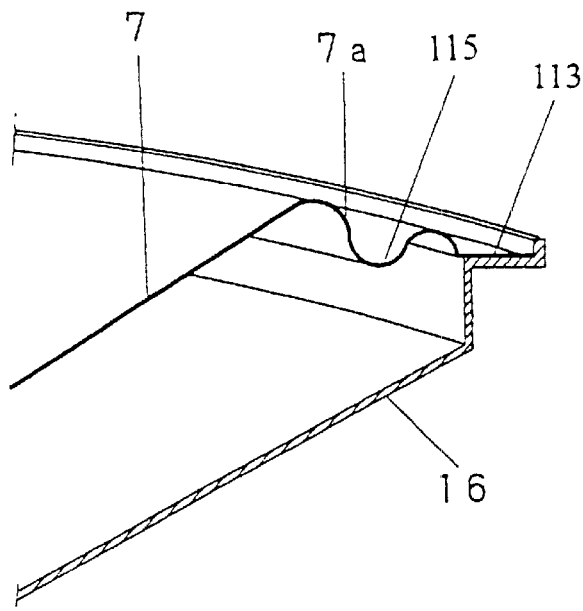
FIG. 15 is a perspective view of the fixed periphery, partly shown in cross section and built in a speaker.

The speaker edge provided herein may have a skin whose face has been transfer 'printed' or embossed with the mold's inner surface (having formed thereon for instance a decorative pattern, any symbols or the like). Such a skin is a very thin layer that is made integral with the inner body of said edge, without any significant boundary intervening therebetween. A bent annular region will act as a boundary between the edge's 7a portion adhered or secured to the vibration plate 7 or frame 16 and the edge's 7a corrugation or rolled portion 115. This boundary will undergo repetition of stress caused by the frequently bending motions of the adjacent members or regions. Therefore, in order to prolong mechanical life of the speaker edge of various embodiments, according to the present invention, as shown, for example, in FIGS. 14 to 16, the thinned basal end 7c corresponding to the bent annular region has preferably a density higher than those of the adjacent remaining thin or thicker regions.

Figure 4:
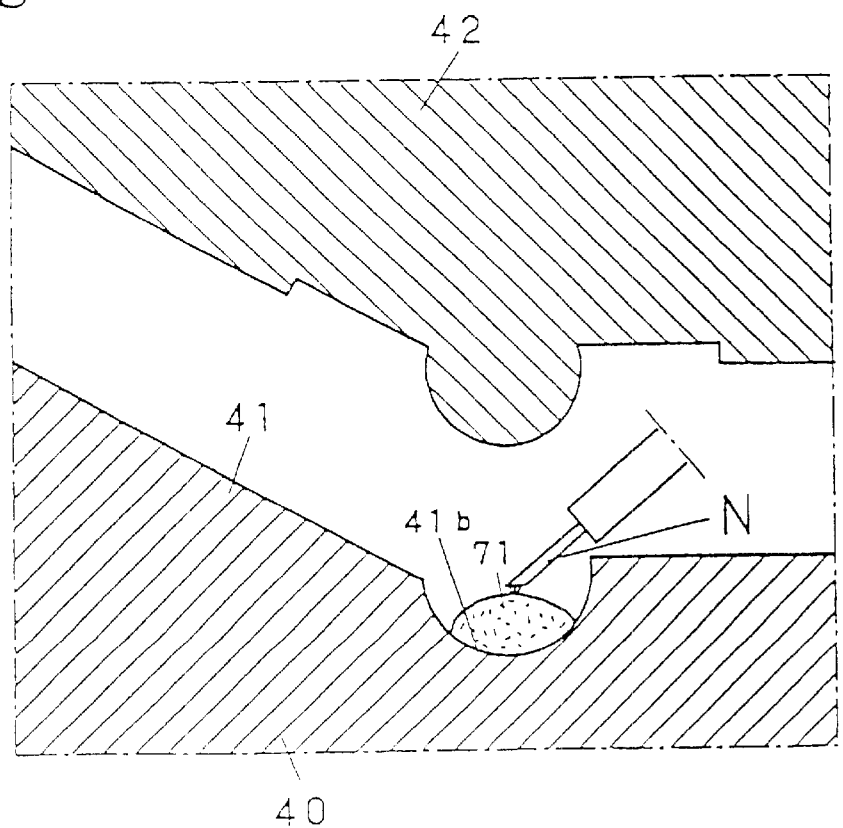
FIG. 4 is a cross section of a mold used to make the speaker edge in accordance with the present invention.

Practical method of using the mold 40 to mold the speaker edge 7a will be detailed referring to FIG. 4. At first the main vibration plate 7 wil be placed in the female segment 41 of the mold 40, and then a given amount of the foamable thermosetting composition 71 is injected into this segment through the nozzle 'N'. Upon injection, the composition foams to spontaneously inflate itself before the male segment 42 will be fitted in the female one 41. Both the male and female segments 41 and 42 are previously heated so that the thermosetting composition 71 will soon become hot to reach the critical hardening temperature of about 80° C. Consequently, the latent hardener is activated to harden the composition mass into a permanent shape as defined by and between the mold's female and male segments 41 and 42. This shape will be such as illustrated in FIG. 4 on an enlarged scale, to give a product of the (reversed) configuration as shown in FIG. 11.

The photo of FIG. 2 is a cross section of the speaker edge manufactured in the manner described above. As will be confirmed in this photo, the arcuate portion of the edge is free from any collapse or any deformation of void cells. Such a uniformly foamed article does not suffer from any deterioration in strength but rather improve acoustic property of the speaker. Further, the vibration plate 7 and edge 7a are firmly adjoined to and consolidated with each other.

Figure 18:
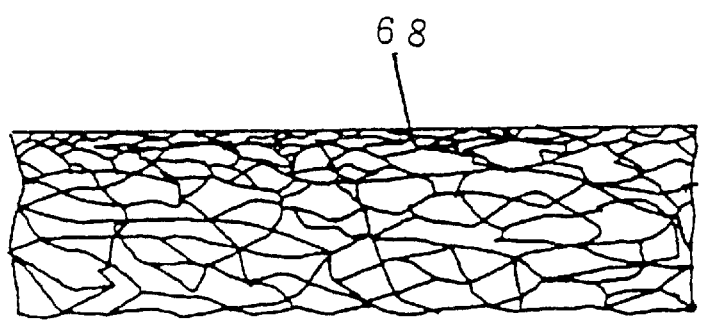
FIG. 18 is a schematic cross section of speaker edge that was made by pressing the foamed two-liquid type polyurethane slab/sheets.

As repeated herein above, the speaker edge 7a of the invention is produced by foaming and thermally hardening the foamable thermosetting composition within the mold segments 41 and 42. Not only the surface layer but also the internal texture are uniform as seen in FIG. 2, thanks to the cells of substantially the same size and homogeneously spread throughout the speaker edge. In contrast, FIG. 3 shows an uneven distribution of void cells of different sizes found in the prior art edge 7a' that is a thermally compressed composite piece consisting of sheets which have been sliced off the two-liquid type polyurethane slab. Thus in the present invention, there is not at all any fear of impairing strength the speaker edge, either in part or as a whole. It is also to be noted here that surfaces of the thermosetting composition mass being spread in the cavity 41b and recesses 42a and 42b will come into contact with the mold's walls. This means that the heat of hardening is almost absorbed by those walls, whereby the void cells do not tend to expand themselves while the mass is hardening itself, thus providing a dense skin layer 68. No pinholes are found in this skin layer 68, which is somewhat denser than the inner foamed body of the speaker edge. Further, any boundary layer or interface does not exist between the skin 68 and the foamed body, contrarily to the prior art case shown in FIG. 18. Such a skin 68 smoothly continuing from the body will neither give rise to any parasitic oscillation nor increase the resonance amplitude. Thickness of the skin layer 68 is not affected by local changes in shape of the mold segments 41 and 42, but the thinner regions 7c and 7c located across the arcuate portion 115 are each of a sufficient thickness. Thin basal ends 7b of the arcuate portion 115 will thus be strong enough to resist breakage during a long-term use of the speaker.

Figure 8:
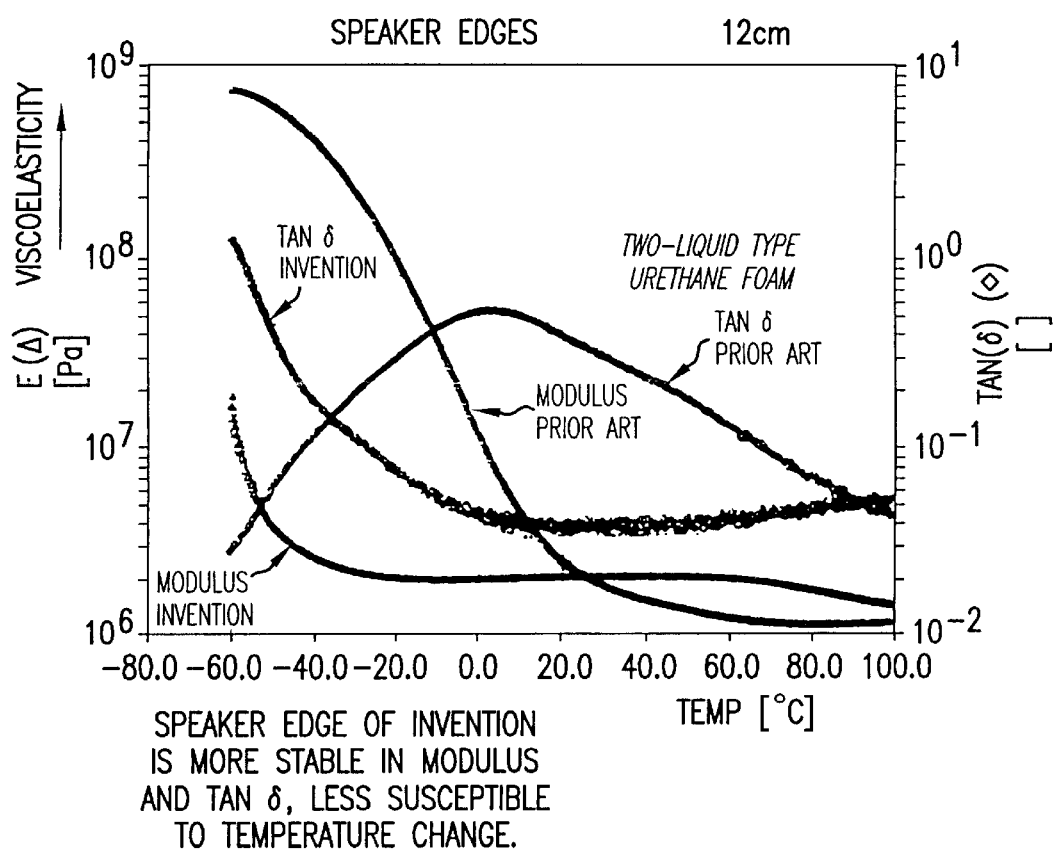
FIG. 8 also is a graph showing the temperature-depending Theological properties measured by testing, within a range of −60° C. to +100° C., the speaker edge of the invention in comparison with the prior art edge that was made from the foamed two-liquid type polyurethane.

As also discussed above, the one-liquid type thermosetting composition is used herein which is mainly composed of the polyurethane prepolymer and the inactivated polyamine as the latent hardener. By virtue of this feature, the speaker edge of the invention can be produced under an easier control of process and reducing consumption of raw materials. Additionally, the speaker whose edge is integrally adhered to the vibration plate is superior to the prior art ones, in its other properties. For example, the foamed piece of the thermosetting composition (i.e., the present edge 7a) of the invention shows its tensile strength or viscoelasticity as a function of temperature, in a manner as shown in FIG. 8. The corresponding properties of the prior art two-liquid type polyurethane slab sheets (i.e., the prior at edge 7a') are also denoted on the graph of FIG. 8. The physically foamed edge 7a shows a less change in modulus plotted along the axis of ordinates as the function of temperature shown along the abscissa, in a range of temperature of −60° C. to +100° C. In contrast with this surprising effect, the prior art edge 7a' shows a much greater change in modulus in the same range of temperatures, varying from the order of $10^6$ to the order of $10^9$, viz., about 1000 times as large as the former. There is observed near 0° C. an apparent peak in the value "tan $\delta$", indicating transfer from its glass-like phase to its rubber-like phase. However in the present speaker edge 7a, no point of inflection is present as to the value "tan $\delta$", thus its acoustic behavior proving much less sensitive to change in temperature and accordingly its characteristics as whole proving much better.

Figure 9:
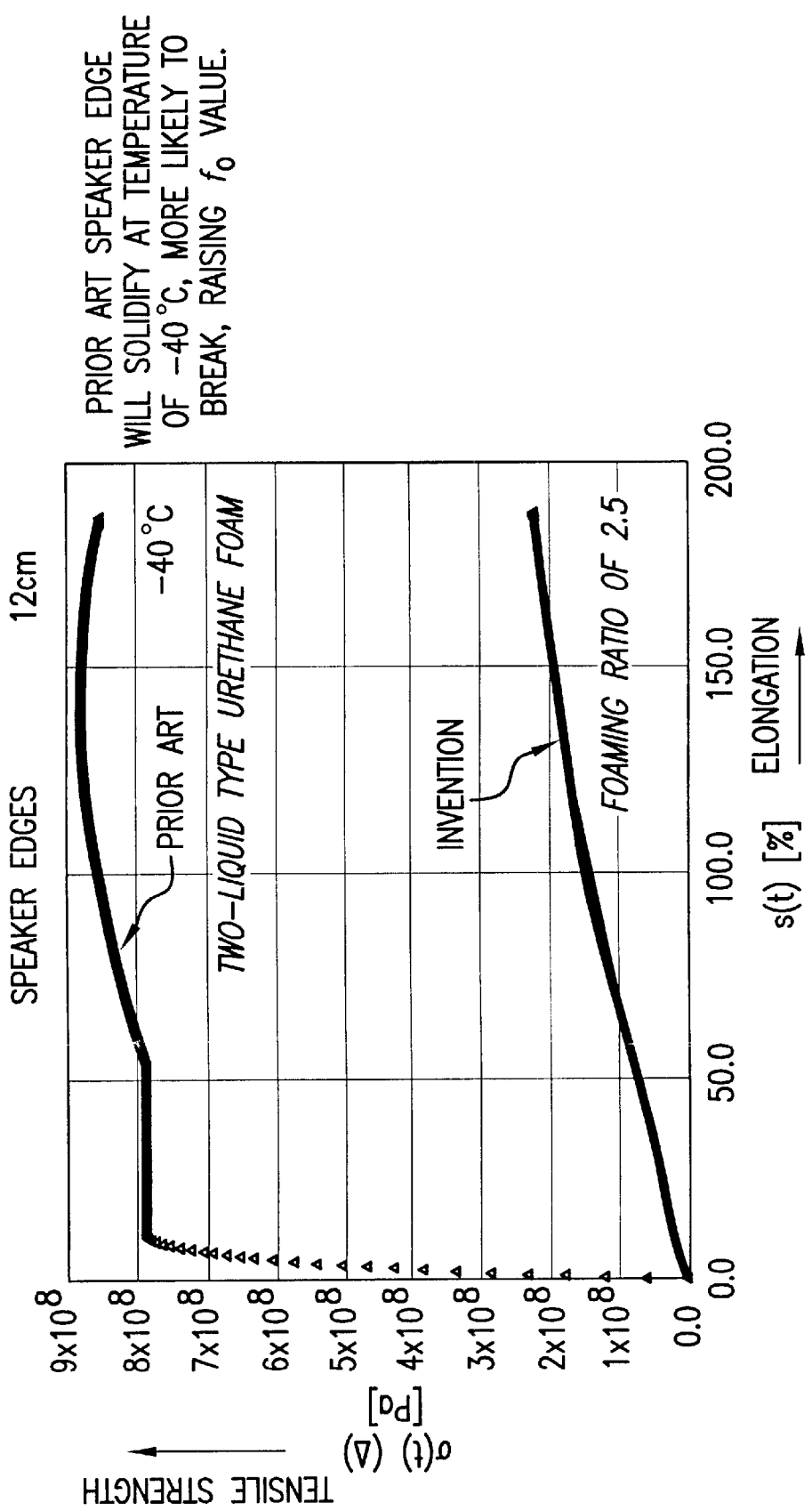
FIG. 9 is another graph of the relationship found between strain (viz., elongation) and stress (viz., breaking strength) measured on the speaker edge of the invention in comparison with the prior art edge that was made from the foamed two-liquid type polyurethane, tested at −40° C.
Figure 10:
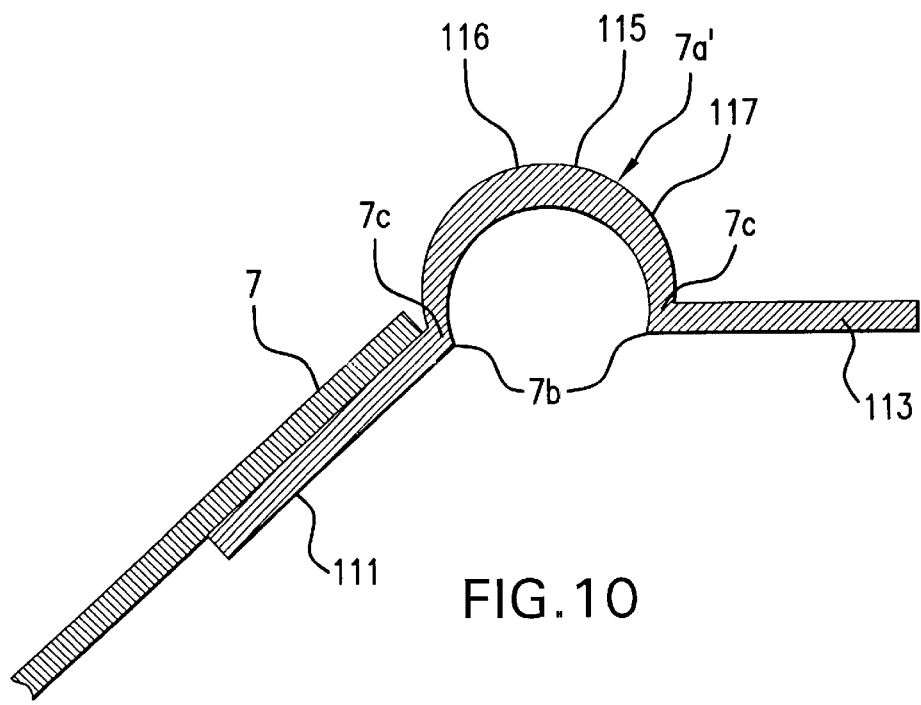
FIG. 10 is a cross section of an arcuate portion present in the prior art speaker edge that was made by pressing the foamed two-liquid type polyurethane slab/sheets.

FIG. 9 represents the relationship between strain (elongation) and stress (breaking strength) observed by tensile test at −40° C. The present speaker edge of the foamed ratio of 2.5 will be compared therein with the prior art two-liquid type one. The stress-strain curve for the present edge shows a gentle and smooth gradient, resembling a linear function and thereby indicating a rubber-like nature. On the other hand, the stress-strain curve for the prior art edge has a point of inflection at elongation of about 20%, quite different from the case of the present edge. This will mean that distortion is likely to take place in regenerated sounds, amplitude of each sound is hardly regenerated accurately, and a band of low-pitched sounds are badly regenerated.

Plasma treatment or primer application may be done to the vibration plate's 7 surface region so that the speaker edge 7*a* can firmly be bonded thereto to become integral therewith in a reliable manner.

As for the method defined from the tenth aspect of the present invention, and also the apparatus and system defined from the twelfth to fourteenth aspects, all of them are advantageous in that the thermosetting composition for forming the speaker edge will harden itself in an instant upon its temperature reaching 80° C. Despite such a quick hardening, the mechanically dispersed gas and the physical foaming of the composition will afford minute void cells of almost the same diameter around the median of about $20\mu$. A microwave range (viz., high-frequency induction heater) may be employed as the heating means.

When producing the speaker edges in accordance with the first or second aspect of the invention, the thermosetting composition will flow within the mold so as to avoid any irregularity in their quality. The composition need not be heated when fed into the mold, so that the main vibration plate 7 will not be injured by heat. Thus, the speaker edge 7*a* can be formed easily in reliable manner so as to become firmly bonded to and integral with said plate inside the mold.

In this case, it is not necessary for any separate operation to be done to bond the edge 7*a* to the vibration plate 7. The thermosetting composition is allowed to flow within the mold until it hardens itself, whereby the edge 7*a* and plate 7 are bonded to and united with each other more firmly, improving durability of the finished speakers. As defined in the third aspect, the void cells in the speaker edge 7*a* are all the closed cells, or some of them are open cells and the others are closed cells, the speaker is rendered more resistant to water.

The thermosetting composition 71 will not suffer from any bad influence caused by moisture in ambient air, during the process of molding the speaker edge in accordance with the third and seventh aspects of the invention. Therefore, neither the foaming ratio nor any other physical properties will vary to an unacceptable extent. Fine and closed void cells are thus produced uniformly in the edge 7*a* of the invention as shown in FIG. 2, wherein their diameter is from 1 to $100\mu$ (median of about $20\mu$) to afford uniform quality to the speaker. In contrast with FIG. 2, FIG. 3 shows open cells having a diameter of from 100 to $200\mu$ observed in the prior art speaker edges. Further, the speaker edge as defined in the sixth aspect, it is of a density from 0.15 to 0.9 g/cm³. This means that such a light speaker edge will render lighter in weight the oscillation as a whole, whereby output coefficient of the speaker will not be lowered and the output sound pressure-frequency characteristic thereof will not deteriorate in the course of time. Thus, the speaker will produce high quality sounds whenever it is turned on to operate at any desired time.

From the seventh aspect of the invention, the speaker edge 7*a* has a skin engraved or embossed in a transfer printing manner corresponding to the decorative pattern or symbols formed on the inner surface of the mold 40. All the front, rear and middle portions in cross section of such a speaker edge 7*a* are of the same foaming ratio so that the resultant speaker is made more resistant to water and has a higher strength. This means that the present speaker edge is free from the drawbacks inherent in the prior art one 7*a*' and schemed in FIG. 18. The prior art edge, that is a heated and compressed sheets sliced from the known already foamed two-liquid type polyurethane, has in cross section the skin 68 whose foaming ratio differs from those observed in the rear and middle region. The prior art has thus failed to ensure an overall uniform structure and to avoid inferiority or deterioration in strength.

The microscopic photo of FIG. 2 does also show the cross section of the speaker edge provided herein from the ninth aspect. As seen in FIG. 2, the density of thin basal ends of the arcuate portion is higher than that of the remaining thicker regions. Such arcuate portion's basal ends, that are most liable to become fatigued caused by oscillation of the vibration plate 7, are now reinforced satisfactorily.

Figure 7:
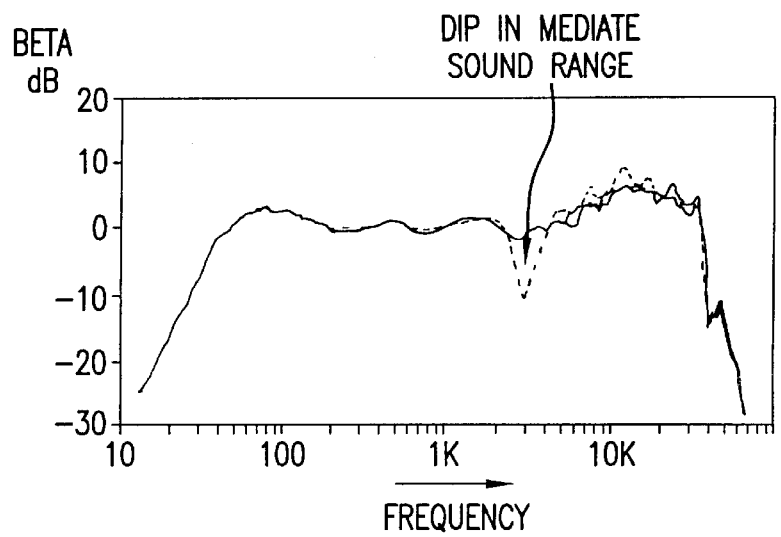
FIG. 7 is a performance graph indicating a relationship between the frequency and the sound pressure as an output from the speaker.

The foamed piece 71 of the thermosetting composition is bonded to be integral with the periphery of vibration plate 7 on one hand, and is adjoined to the inner periphery of frame 16 on the other hand. This piece in such a state will retain the pate 7 at its correct position not to inhibit it from oscillating in axial direction. Further, such foamed piece will ensure a desired level of acoustic resistance of the speaker edge 7*a*, so as to allow it to absorb reflected vibrational energy. The solid curve in FIG. 7 indicates the sound pressure-frequency characteristics of the speaker of the invention, wherein no 'dip' is observed at a middle zone of frequency, in contrast with a sharp or deep dip inherent in the prior art speakers. This feature will be evidenced also by the fact that the foamed thermosetting compound of the invention showed its physical properties including the value tan δ scarcely varying relative to its temperature, thus indicating a very significant improvement in the ratio of vibration absorbed by the speaker edge provided herein.

Now, the polyurethane prepolymer as one of the main ingredients of the thermosetting composition used in the embodiments will be detailed further. 100 parts by weight of a polyether-polyol whose average molecular weight was 5000 were used to react with 16 parts by weight of diphenylmethane diisocyanate for 2 hours at 80° C. A resultant polyurethane prepolymer had 2.4% of end NCO groups and its viscosity was 100,000 cps at 20° C. An inactivated polyamine as the latent hardener, that is the other main ingredient, was prepared as follows. 76.9 parts by weight of powdery 1,12-dodecane diamine (its melting point being 71° C.) whose median diameter was about $8\mu$, was intermixed with 23.1 parts by weight of powdery titanium dioxide whose median diameter was about $0.02\mu$. This mixture was pulverizingly kneaded in a jet mill to give 100 parts by weight of fine powder-coated amine whose median diameter was about $8\mu$. Next, 50 parts by weight of the polyurethane prepolymer having the active end isocyanate groups, 5 parts by weight of the latent hardener, 15 parts by weight of calcium carbonate, 10 parts by weight of carbon black, and 20 parts by weight of a plasticizer were blended with each other in a 'chemi-stirrer' to give the one-liquid type thermosetting composition 10 whose critical hardening temperature was about 80° C.

Figure 5:
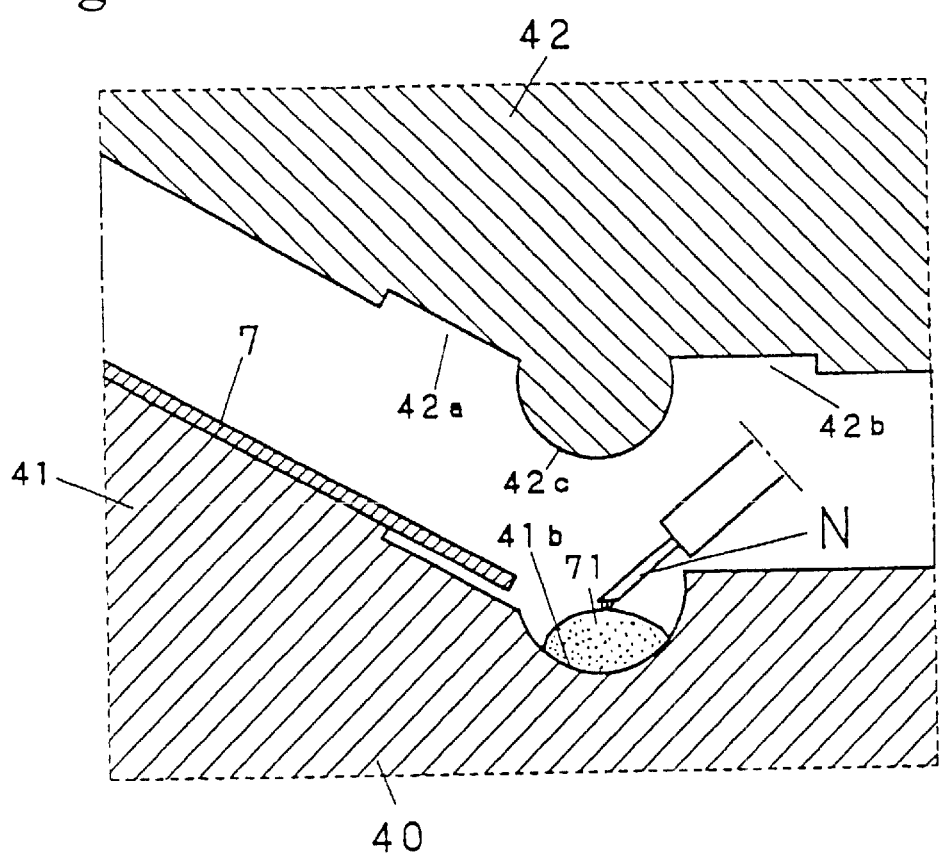
FIG. 5 is likewise a cross section of the mold shown in FIG. 4, and in which mold a vibration plate is placed when insert-molding the speaker edge around and integral with the periphery of said vibration plate.

The one-liquid type thermosetting composition 10 was used in the following manner. At first, a dried air as the gas 11 was fed to the foam-molding apparatus 50 shown in FIG. 6, together with the composition 10 to obtain the foamable thermosetting composition 71. This foamable composition was to be pumped into the mold 40. Before injecting this composition 71 into the mold 40 through the nozzle 'N', a previously prepared vibration plate 7 was placed in the mold. Subsequently, a curved recess 41b formed in the female segment 41 to provide the arcuate portion in a rolled-type edge and kept at a temperature below about 60° C. did receive a predetermined amount of the foamable composition 71 through the nozzle 'N'. Next, the male segment 42 heated to a temperature above the critical hardening point 80° C. was fitted in the female segment 41. As a result, portions of the injected mass of said composition 71 flowed into one of the groove-shaped recesses 42a to provide the inner periphery, and also flowed into the other recess 42b to provide the outer periphery. A curved space was defined between the rolled type-edge forming recess 41b and a mating rolled type-edge forming protrusion 42c of the male segment. Simultaneously with the flows into said recesses 42a and 42b, this curved space was filled with the remaining portion of the injected mass, and the latter was compressed in said space. In this way, a speaker edge having the rolled type arcuate portion 115, the inner periphery 111 and the outer periphery 113 was manufactured by foam-hardening all the mass portions mentioned above. This speaker edge 7a was in accordance with the ninth aspect, since its thinned basal ends of the arcuate portion had a density higher than that of remaining thicker regions of the edge. FIG. 5 is an enlarged cross section of the edge 7a, that was integrally bonded in this manner to the periphery of a main body of vibration plate 7 so as to give a finished composite vibration plate as one part of the speaker. This speaker edge 7a showed the value of about 2.5 as its foaming ratio. It will now be apparent that neither any separate step of bonding the plate 7 to the edge 7a nor any adhesives is necessitated to firmly dispose said edge around said plate. Uniform adjoining of these members without aid of adhesives will lower manufacture cost and improve the frequency characteristics of the finished speaker.

The foam-molding method of and apparatus for making the speaker edge 7a of the invention is characterized in that the gas as the foaming agent is mechanically dispersed throughout the thermosetting composition just before the molding thereof to form the edge. In this system, the gas will act to foam the compound also immediately before hardening and molding the speaker edge in the mold. It is no longer necessary to blend three components, that is a principal ingredient (e.g., isocyanate compound), a hardening agent (e.g., polyol) and a foaming agent, thus saving raw materials (viz., diminishing the so-called 'purge' loss). The mechanical mixing and physical foaming of the raw composition and the gas serving as the foaming agent almost all the void cells produced are the closed cells. In other words, the molded article is devoid of any open cells or accompanied by an extremely small number of them, thus enhancing mechanical strength and physical properties of the speaker edge. Its inner texture is uniform to an almost perfect degree from in macroscopic view, thus affording a speaker edge of an excellent acoustic characteristics.

Although some preferable embodiments are described above, the present invention is not restricted thereto but may be modified in any appropriate manners, insofar as the aforementioned objects are achieved to afford the advantages summarized below.

INDUSTRIAL UTILIZATION

In summary, the molding method, the foam-molding system and apparatus proposed herein for making a speaker edge are based on the principle that a gas as the foaming agent is mechanically dispersed in a thermosetting composition of the one-liquid type, just prior to the molding step, so as to foam the composition at this step. It is not necessary for a main ingredient, a hardener and a foaming agent to be intermixed in any other manner, thus never incurring any waste (viz., purge loss) of raw materials. Such a process is not affected adversely by any change in atmospheric humidity or temperature, so that control of process, including interruption thereof, is now facilitated. The volume-activator type feeding of the thermosetting composition and the gas as well as the means for adjusting and/or regulating the foaming ratio are effective to improve reproducibility and afford precise feed batches. The foaming ratio is now controlled accurately and easily to diminish variation in said ratio among the batches. The composition need not be hardened in any special manner, but can now be practiced in any desired manner. The raw thermosetting composition will instantly harden itself if heated above its critical hardening temperature, so that the mold need no longer be cooled down extremely below this temperature before the next cycle of molding. Thanks to this feature, operation cycle for batch-wise production is now shortened to a remarkable extent, thereby improving manufacture efficiency.

The void cells thus produced in each speaker edge are almost of the closed type, due to mechanical mixing of the gas as the foaming agent. Any noticeable number of open cells will not be produced in said edge, and the foaming ratio can be changed easily to regulate the size of void cells and also to reduce said size enough to render almost uniform the internal texture of said edge from a macroscopic point of view. Any unevenness is avoided not to impair strength but to raise the strength of thin bassal ends of the arcuate portion. Speaker edge thus produced is now not only excellent in its mechanical strength but also highly resistant to water. It is lighter in weight and improved in its various physical properties, so that speakers can now be produced easily and inexpensively, which speakers will show each an excellent acoustic behavior and be almost free from variation in their properties. These advantages have not been afforded in any cases of the prior art speaker edges or prior art speakers.

It will now be apparent that the recipe of thermosetting composition substantially consisting of the polyurethane prepolymer and the inactivated polyamine as the latent hardener realizes an easier and inexpensive process for manufacture of speakers less apt to vary in their performance and/or quality.

Time schedule inclusive of interruption of operation can now be made more easily and simply for the manufacture process of speaker edges 7a of the invention, because there is no fear of allowing ingredients of the prior art two-liquid type composition to solidify soon, causing a mixer jammed with them unless they are consumed promptly and completely.

A very uniformly foamed state is now ensured as shown in FIGS. 2 and 12, since the speaker edge 7a of the invention is produced using a one-liquid type composition to be thermally hardened without being affected by ambient humidity or the like condition. The practical way of hardening the composition can be varied or modified to meet any demand and/or requirements.

Figure 16:
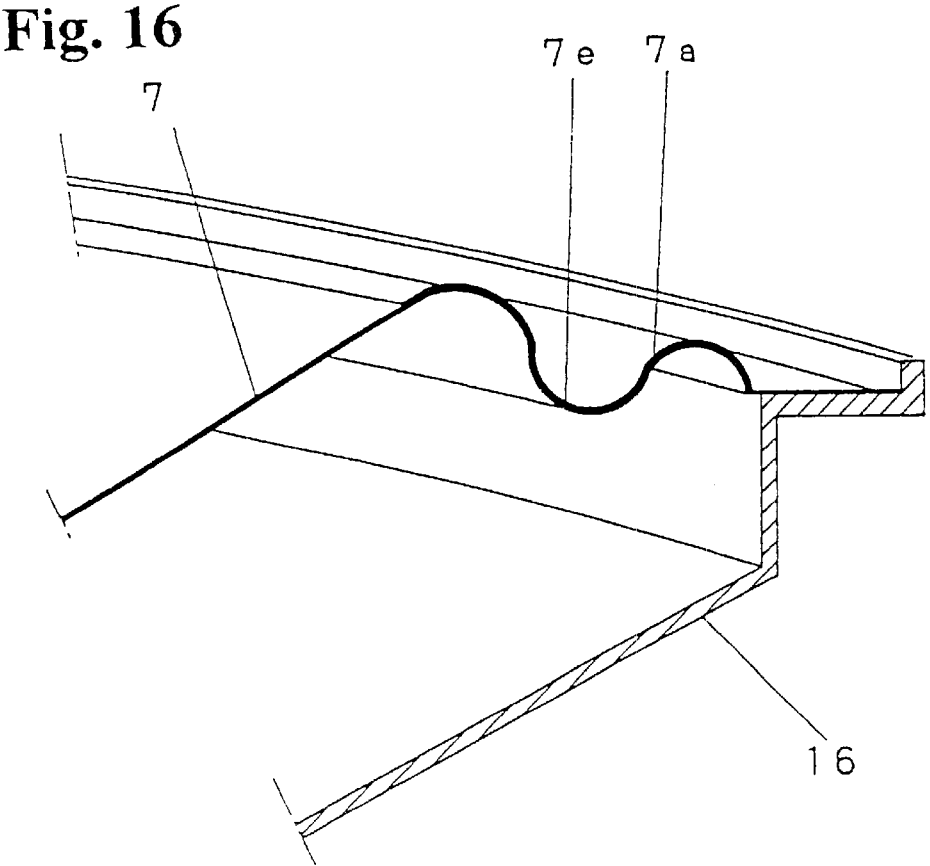
FIG. 16 is a perspective view of a damped periphery of the speaker edge, partly shown in cross section and built in another speaker.
Figure 17:
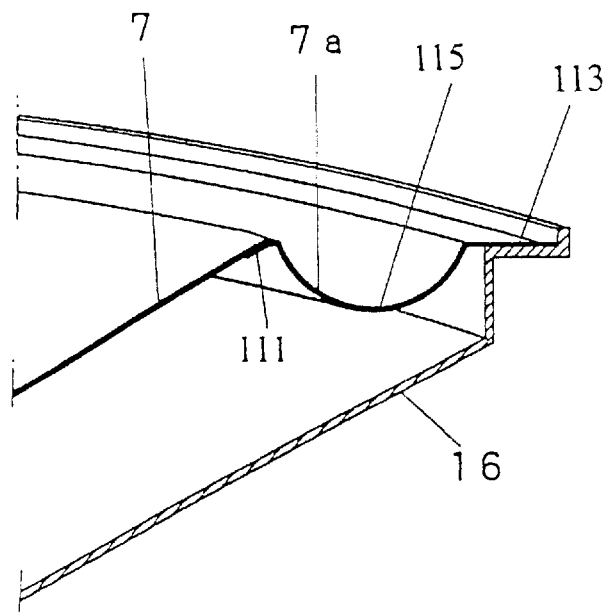
FIG. 17 is likewise a perspective view of a rolled periphery of the prior art speaker edge.

A damping paint 7e may be applied to the speaker edge 7a of the invention as shown in FIG. 16 so that it can maintain its proper acoustic resistance to reliably absorb reflected oscillation energy at the outer periphery of the vibration plate 7 whenever it operates. Any dip will not appear in the mediate frequency band in the output sound pressure from the speaker, thus ensuring excellent regeneration of sounds.

The mechanical foaming of the thermosetting composition of the invention will afford the following advantages, in comparison with the prior art method of making speaker edges from the two-liquid type composition;

(a) no loss of raw materials due to the mixing of main ingredients with a hardener;

(b) fine and uniform closed cells, by virtue of the mechanical dispersion and physical foaming of the gas;

(c) better acoustic property and higher mechanical strength, thanks to the closed cells;

(d) rapid hardening (within 30 seconds) raising manufacture efficiency, due to a sharp critical temperature of the thermosetting compound;

(e) accurate regulation of the mixing condition and foaming ratio, afforded by the piston-type pump to mix the gas with the composition; and (f) simpler equipment or plant rendering maintenance works much easier.

What is claimed is:

1. A speaker edge made of a thermosetting composition whose main ingredients are a polyurethane prepolymer and a latent hardener, and the latent hardener being an inactivated solid polyamine, wherein a gas is dispersed in the thermosetting composition, prior to feed thereof into a mold, so that the composition subsequently foams and solidifies itself in the mold to give the speaker edge.

2. A speaker edge as defined in claim 1, wherein the speaker edge is adhered to and integral with the main body of a vibration plate.

3. A speaker edge as defined in claim 1 or 2, wherein internal void cells produced in the speaker edge consist solely of closed cells, or consist a mixture of closed cells and open cells.

4. A speaker edge as defined in claim 1 or 2, wherein the internal void cells are of a size falling within a range of $1\mu$ to $100\mu$.

5. A speaker edge as defined in claim 1 or 2, wherein the internal void cells have diameters whose average is $20\mu$ and are distributed beside this average as a median diameter.

6. A speaker edge as defined in claim 1 or 2, wherein it has a density falling within a range of 0.15–0.9 g/cm3.

7. A speaker edge as defined in claim 1 or 2, wherein it has a skin layer whose surface is embossed with the pattern of the mold's internal surface.

8. A speaker edge as defined in claim 1 or 2, wherein it has the skin layer smoothly continuing to an inner core of said edge, without any apparent or distinctive boundary intervening between them.

9. A speaker edge as defined in claim 1 or 2, wherein it has an arcuate portion whose thin basal ends are at least of the same density as that of the remaining thicker regions.

10. A method of making a speaker edge, the method comprising the steps of:

preparing a thermosetting composition whose main ingredients are a polyurethane prepolymer and a latent hardener, the latent hardener being an inactivated solid polyamine, then mechanically dispersing a gas throughout the thermosetting composition, thereafter injecting this composition into a female mold segment that has been heated to a temperature below the intrinsic critical thermosetting temperature of the composition, allowing it to start to foam, and subsequently putting a male mold segment in the female segment, wherein the male segment has been heated to a higher temperature above the critical temperature so that the ingredients react with each other to solidify within the mold.

11. The method as defined in claim 10, wherein a high-frequency induction heater is used to solidify the foamed thermosetting composition.

12. An apparatus for making from a thermosetting composition a speaker edge, the apparatus comprising:

1. a suction device linked to a piston-type pump having a cylinder in which the piston reciprocates, the device acting to suck air into the cylinder during suction stroke of the piston;

2. a feed device for charging the cylinder with the composition after the cylinder is filled with the gas;

3. a stirring device for mechanically mixing with the composition with the gas during exhaustion stroke of the piston;

4. a compression device for injecting the gas-dispersed thermosetting composition into a female segment of a mold forming the speaker edge, wherein the female segment is heated to a temperature below the thermosetting critical temperature;

5. a pressing device for fitting a male segment in the female segment, wherein the male segment is heated to another temperature above the thermosetting critical temperature; and

6. a molding device for foaming and solidifying therein the foamable thermosetting composition.

13. An apparatus as defined in claim 12, wherein a high-frequency induction heater is used to solidify the foamed thermosetting composition.

14. A system for making from a thermosetting composition a speaker edge, the system comprising:

(1.) a suction process using a piston-type pump that has a cylinder in which the piston reciprocates, the process being designed to suck air into the cylinder during suction stroke of the piston;

(2.) a feed process for charging the cylinder with the composition after the cylinder is filled with the gas;

(3.) a stirring process for mechanically mixing with the composition with the gas during exhaustion stroke of the piston;

(4.) a compression process for injecting the gas-dispersed thermosetting composition into a female segment of a mold forming the speaker edge, wherein the female segment is heated to a temperature below the thermosetting critical temperature;

(5.) a pressing process for fitting a male segment in the female segment, wherein the male segment is heated to another temperature above the thermosetting critical temperature; and (6.) a molding process for foaming and solidifying therein the foamable thermosetting composition.

15. A system as defined in claim 14, wherein a high-frequency induction heater is used to solidify the foamed thermosetting composition.

16. A speaker comprising a vibration plate built therein and a speaker edge, wherein the speaker edge is made of a thermosetting composition whose main ingredients are a polyurethane prepolymer and a latent hardener, with the latent hardener being an inactivated solid polyamine, wherein a gas is dispersed in and throughout the thermosetting composition, prior to feed thereof into a mold, so that the composition foams and solidifies itself therein to give the speaker edge.

* * * * *